(12) United States Patent
Akiba et al.

(10) Patent No.: US 8,887,886 B2
(45) Date of Patent: Nov. 18, 2014

(54) POWER TRANSMISSION DEVICE

(75) Inventors: Yoshio Akiba, Wako (JP); Takeshi Yoshida, Wako (JP); Masahiro Imamura, Wako (JP); Takabumi Suzuki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 199 days.

(21) Appl. No.: 13/520,432

(22) PCT Filed: Dec. 27, 2010

(86) PCT No.: PCT/JP2010/073521
§ 371 (c)(1),
(2), (4) Date: Jul. 3, 2012

(87) PCT Pub. No.: WO2011/089825
PCT Pub. Date: Jul. 28, 2011

(65) Prior Publication Data
US 2013/0199883 A1    Aug. 8, 2013

(30) Foreign Application Priority Data

Jan. 25, 2010  (JP) ................................. 2010-012989
Jan. 25, 2010  (JP) ................................. 2010-012990
Jan. 25, 2010  (JP) ................................. 2010-012991

(51) Int. Cl.
*F16D 25/08*   (2006.01)
*F16D 25/10*   (2006.01)
*F16D 21/02*   (2006.01)
*F16H 48/19*   (2012.01)
*F16H 48/32*   (2012.01)
*F16D 21/06*   (2006.01)

(52) U.S. Cl.
CPC .............. *F16D 21/02* (2013.01); *F16D 25/082* (2013.01); *F16D 25/10* (2013.01); *F16H 48/19* (2013.01); *F16H 48/32* (2013.01); *F16H 2200/2071* (2013.01); *F16D 2021/0661* (2013.01); *F16D 2021/0692* (2013.01)
USPC .................................. 192/48.606; 192/48.91

(58) Field of Classification Search
CPC ................................. F16D 11/08; F16D 11/11
USPC ........ 192/48.606, 48.607, 48.611, 48.91, 112
See application file for complete search history.

(56) References Cited

U.S. PATENT DOCUMENTS 2,747,711 A * 5/1956 Schmitter et al. ......... 192/48.614
4,181,042 A * 1/1980 Rau et al. ...................... 475/138

(Continued)

FOREIGN PATENT DOCUMENTS

JP    1-303366 A    12/1989
JP    7-61251 A     3/1995

(Continued)

OTHER PUBLICATIONS

International Search Report for PCT/JP2010/073521, mailing date of Feb. 1, 2011.

*Primary Examiner* — Rodney H Bonck
*Assistant Examiner* — Stacey Fluhart
(74) *Attorney, Agent, or Firm* — Westerman, Hattori, Daniels & Adrian, LLP (57) ABSTRACT

Pressures of left and right clutch pistons (55, 63) applied to left and right disk portions (42b, 42d) of a common clutch outer (42) of left and right clutches (29, 30) distributing drive force of an input shaft (20) to left and right output shafts (23, 24) are, finally, transmitted to and supported by a side housing (12) through a boss portion (42a) of the clutch outer (42) and a thrust bearing (53, 52, 48; 41, 27). Accordingly, the left and right clutches (29, 30) can be engaged with no problem. Even when the pressures of the clutch pistons (55, 63) deform the left and right disk portions (42b, 42d) of the clutch outer (42), the gap ($\alpha$) formed therebetween prevents the transmission of the pressure of one of the clutches (29, 30) to the other clutch (29, 30). Accordingly, the interference between the operations of the left and right clutches (29, 30) is prevented.

6 Claims, 8 Drawing Sheets

(56) References Cited

U.S. PATENT DOCUMENTS

| | | | |
|---|---|---|---|
| 8,413,783 B2* | 4/2013 | Shimizu et al. | 192/85.63 |
| 2006/0267331 A1* | 11/2006 | Tanaka | 280/806 |
| 2008/0004150 A1 | 1/2008 | Davidsson et al. | |
| 2008/0236983 A1* | 10/2008 | Kummer | 192/87.11 |
| 2008/0277239 A1* | 11/2008 | Gassmann et al. | 192/85 R |
| 2009/0045026 A1* | 2/2009 | Ishii et al. | 192/87.14 |
| 2009/0100965 A1* | 4/2009 | Sanji et al. | 74/606 R |
| 2010/0083792 A1* | 4/2010 | Ariga et al. | 74/606 R |

FOREIGN PATENT DOCUMENTS

| | | |
|---|---|---|
| JP | 2894428 B2 | 5/1999 |
| JP | 2001-263464 A | 9/2001 |
| JP | 2006-182242 A | 7/2006 |
| JP | 2008-525267 A | 7/2008 |
| JP | 2008-252989 A | 10/2008 |

* cited by examiner

POWER TRANSMISSION DEVICE

TECHNICAL FIELD

The present invention relates to a power transmission device in which two clutches are disposed with their back sides facing each other so as to distribute the rotation of an input shaft independently to left and right output shafts.

BACKGROUND ART

Patent Document 1 listed below describes a publicly known rear differential gear which is configured to distribute drive force, inputted from an engine through a propeller shaft, to left and right rear wheels and includes a pair of left and right clutches sharing a clutch outer. In this rear differential gear, a slip ring is fixed to center portions, in the left-right direction, of inner peripheral splines of the clutch outer. Frictional engagement members are disposed at both the left and right of the slip ring. The left clutch is engaged by causing a left clutch piston to press the left frictional engagement members against the slip ring, while the right clutch is engaged by causing a right clutch piston to press the right frictional engagement members against the slip ring.

PRIOR ART DOCUMENT

Patent Document

Patent Document 1: Japanese Patent No. 2894428

SUMMARY OF THE INVENTION

Problems to be Solved by the Invention

Meanwhile, in the conventional one described above, as the clutch piston of, for example, the left clutch presses the left frictional engagement members rightward, the slip ring, deforms rightward and causes the right frictional engagement members of the right clutch to contact each other. On the other hand, as the clutch piston of the right clutch presses the right frictional engagement members leftward, the slip ring deforms leftward and causes the left frictional engagement members of the left clutch to contact each other. This has been causing a problem that the operations of the left and right clutches interfere with each other and deteriorate the accuracy of control on their engagement forces.

The present invention has been made in view of the above circumstance and has an object to prevent interference between the operations of left and right clutches which are disposed with their back sides facing each other and share a clutch outer.

Means for Solving the Problems

In order to attain the above object, according to a first aspect of the present invention, there is provided a power transmission device comprising left and right clutches including: left and right output shafts supported on a housing, the left and right output shafts being coaxial and rotatable relative to each other; an input shaft disposed on an outer periphery of one of the left and right output shafts in such a way as to be rotatable relative thereto; a clutch outer coupled to the input shaft; left and right clutch inners coupled to the left and right output shafts, respectively; a plurality of left frictional engagement members disposed between the clutch outer and the left clutch inner; a plurality of right frictional engagement members disposed between the clutch outer and the right clutch inner; a left clutch piston configured to press the left frictional engagement members toward the right frictional engagement members; and a right clutch piston configured to press the right frictional engagement members toward the left frictional engagement members, characterized in that the clutch outer includes a boss portion positioned in an axial direction between the left and right clutch inners through a thrust bearing, left and right disk portions branching in two ways from the boss portion so as to support pressures of the left and right clutch pistons transmitted through the left and right frictional engagement members, respectively, and left and right drum portions extending in the axial direction from the left and right disk portions so as to guide outer peripheral portions of the left and right frictional engagement members, respectively, and a gap is formed between the left and right disk portions.

Furthermore, according to a second aspect of the present invention, in addition to the first aspect, there is provided the power transmission device further comprising an oil pump in which a pump rotor supported on the input shaft is housed inside a pump case, wherein movement of the oil pump in the axial direction is restricted by use of a stepped portion provided to the input shaft and of a bearing supporting the input shaft on the housing, and movement of the oil pump in a radial direction is restricted by fitting an annular rib, which projects from an inner surface of the housing, to an annular rib, which projects from an outer surface of the pump case.

Moreover, according to a third aspect of the present invention, in addition to the second aspect, there is provided the power transmission device, wherein positioning of the pump case about the input shaft is performed by bringing front and rear ribs projecting from the inner surface of the housing into contact with front and rear surfaces of the pump case which are eccentric from the input shaft.

Furthermore, according to a fourth aspect of the present invention, in addition to any one of the first to third aspects, there is provided the power transmission device, wherein oil discharged by the oil pump is supplied as lubrication oil to the left and right clutches through an inside of the input shaft.

Moreover, according to a fifth aspect of the present invention, in addition to the fourth aspect, there is provided the power transmission device, wherein an electric oil pump configured to supply hydraulic pressures to the left and right clutches is housed in a pump chamber defined inside the housing and filled with oil, a pump shaft of the electric oil pump is connected to and driven by a rotary shaft of an electric motor, and an air chamber filled with air is defined between the electric motor, which is fixed to an outer portion of the housing, and the pump chamber.

Furthermore, according to a sixth aspect of the present invention, in addition to the fifth aspect, there is provided the power transmission device, wherein a rotor for detecting a rotational speed of the electric motor is fixed to the rotary shaft penetrating the air chamber.

Here, a center housing 11, a side housing 12 and a side cover 13 of an embodiment correspond to the housing of the present invention; a first sleeve 20 of the embodiment corresponds to the input shaft of the present invention; a tapered roller bearing 21 of the embodiment corresponds to the bearing of the present invention; left and right oil pumps 31, 32 of the embodiment correspond to the electric oil pump of the present invention; a lubrication oil pump 34 of the embodiment corresponds to the oil pump of the present invention; a rotor chamber 87 of the embodiment corresponds to the air chamber of the present invention; and an inner rotor 105 of the embodiment corresponds to the pump rotor of the present invention.

Effects of the Invention

According to the first aspect of the present invention, as the left clutch piston is driven, the left frictional engagement members are pressed against the left disk portion of the clutch outer and come into close contact with each other. Thus, the rotation of the input shaft is transmitted to the left output shaft from the left drum portion of the clutch outer through the left frictional engagement members and the left clutch inner. As the right clutch piston is driven, the right frictional engagement members are pressed against the right disk portion of the clutch outer and come into close contact with each other. Thus, the rotation of the input shaft is transmitted to the right output shaft from the right drum portion of the clutch outer through the right frictional engagement members and the right clutch inner. The pressures applied to the left and right disk portions are transmitted to and supported by the housing through the boss portion and the thrust bearing. Accordingly, the left and right clutches can be engaged with no problem. Even when the pressures of the left and right clutch pistons deform the left and right disk portions of the clutch outer, the gap formed therebetween prevents the transmission of the pressure of the clutch piston of one of the clutches to the other clutch. Accordingly, the interference between the operations of the left and right clutches is prevented.

Moreover, according to the second aspect of the present invention, movement, in the axial direction, of the oil pump in which the pump rotor supported on the input shaft is housed inside the pump case is restricted by use of the stepped portion provided to the input shaft and of the bearing supporting. the input shaft on the housing; and moreover, movement of the oil pump in the radial direction is restricted by fitting the annular rib, which projects from the inner surface of the housing, to the annular rib, which projects from the outer surface of the pump case. Thus, the oil pump can be positioned in the axial direction and in the radial direction without using special fixing members such as bolts. Accordingly, it is no longer necessary to split the housing into two parts in the front-rear direction or in the up-down direction. This makes it possible to reduce the number of components and the dimensions.

Moreover, according to the third aspect of the present invention, the front and rear ribs projecting from the inner surface of the housing are brought into contact with the front and rear surfaces of the pump case which are eccentric from the input shaft, respectively. Accordingly, the positioning of the pump case about the input shaft can be performed without using special fixing members such as bolts.

Moreover, according to the fourth aspect of the present invention, the oil discharged by the oil pump is supplied as lubrication oil to the left and right clutches through the inside of the input shaft. Accordingly, the lubrication oil can be supplied from the oil pump to the left and right clutches by the shortest route.

Moreover, according to the fifth aspect of the present invention, the electric oil pump configured to supply hydraulic pressures to the left and right clutches is housed in the pump chamber defined inside the housing and filled with oil, and the air chamber filled with air is defined between the electric motor, which is fixed to the outer portion of the housing, and the pump chamber. Thu, even when leaking out of the pump chamber, the oil or the moisture included in the oil can be received by the air chamber and therefore prevented from directly entering the inside of the electric motor. Accordingly, damage on the electric motor and deterioration of the durability thereof can be prevented.

Moreover, according to the sixth aspect of the present invention, the rotor for detecting a rotational speed of the electric motor is fixed to the rotary shaft, which penetrates the air chamber, of the electric motor. Accordingly, there is no resistance due to the stirring of the oil, which would be generated if the rotor were disposed in the pump chamber, and the power consumption of the electric motor can therefore be lowered.

EXPLANATION OF REFERENCE NUMERALS AND SYMBOLS

11 center housing (housing)
11*a* rib
11*b* rib
11*c* rib
12 side housing (housing)
13 side cover (housing)
20 first sleeve (input shaft)
20*c* stepped portion
21 tapered roller bearing (bearing)
23 left output shaft
24 right output shaft
29 left hydraulic clutch
30 right hydraulic clutch
31 left oil pump (electric oil pump)
32 right oil pump (electric oil pump)
33 electric motor
34 lubrication oil pump (oil pump)
41 thrust bearing
42 clutch outer
42*a* boss portion
42*b* left disk portion
42*c* left drum portion
42*d* right disk portion
42*e* right drum portion
50 left clutch inner
53 thrust bearing
54 left frictional engagement member
55 left clutch piston
61 right clutch inner
62 right frictional engagement member
63 right clutch piston
79 pump chamber
84 pump shaft
87 rotor chamber (air chamber)

Figure 1:
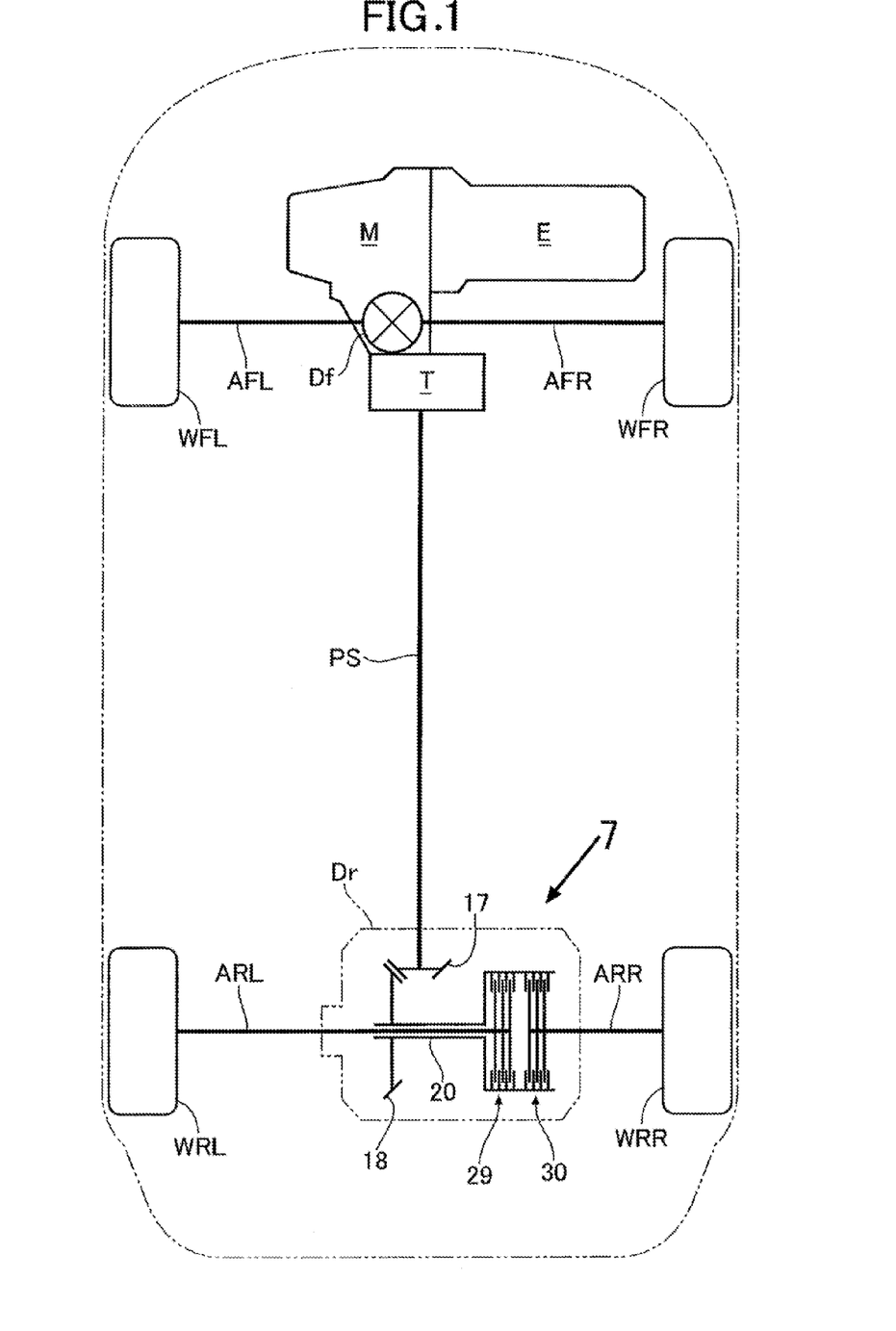
FIG. 1 is a view showing a power transmission path of a four-wheel drive vehicle. (first embodiment)

88 rotary shaft
92 rotor
102 left pump case
103 right pump case
103b rib
105 inner rotor (pump rotor)
α gap Mode for Carrying out the Invention Hereinbelow, an embodiment of the present invention will be described based on FIGS. 1to 8.
First Embodiment As shown in FIG. 1, a four-wheel-drive vehicle based on a front-engine front-drive vehicle includes: front wheels WFL and WFR as primary drive wheels to which the drive force of an engine E is transmitted through a transmission M, a front differential gear Df, and left and right axles AFL and AFR; and rear wheels WRL and WRR as secondary drive wheels to which part of the drive forces of the front wheels WFL and WFR is transmitted through a transfer T, a propeller shaft PS, a rear differential gear Dr, and left and right axles ARL and ARR.

Figure 2:
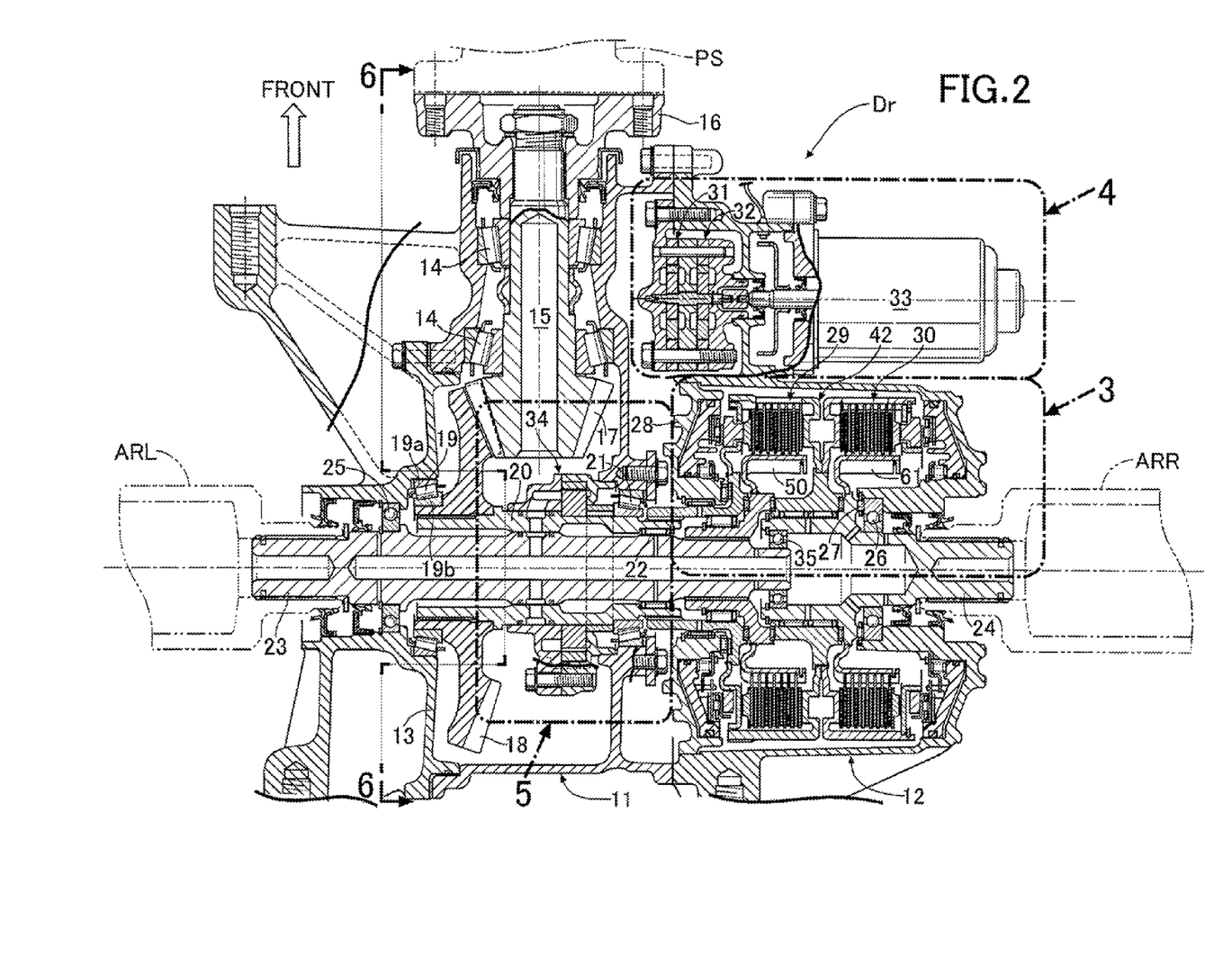
FIG. 2 is a longitudinal sectional view of a rear differential gear. (first embodiment)

As shown in FIG. 2, the rear differential gear Dr includes a center housing 11, a side housing 12 coupled to a right surface of the center housing 11, and a side cover 13 coupled to a left surface of the center housing 11. An input shaft 15 extending in a front-rear direction of a vehicle body is rotatably supported on the center housing 11 through two tapered roller bearings 14, 14. A flange 16 provided at a front end of the input shaft 15 is coupled to a rear end of a propeller shaft PS. A follower bevel gear 18 that meshes with a drive bevel gear 17 provided at a rear end of the input shaft 15 is rotatably supported on the side cover 13 through a tapered roller bearing 19. A first sleeve 20 is disposed in a vehicle width direction such that a left end thereof is spline-fitted to the follower bevel gear 18 and that a right end thereof is rotatably supported on the center housing 11 through a tapered roller bearing 21.

A left output shaft 23 fitted in the first sleeve 20 through a needle bearing 22 to be rotatable relative thereto is rotatably supported on the side cover 13 through a ball bearing 25. The left axle ARL is coupled to a left end of the left output shaft 23. A right output shaft 24 disposed coaxially with the left output shaft 23 is rotatably supported on the side housing 12 through a ball bearing 26 and a thrust bearing 27. Moreover, the right output shaft 24 is supported on an outer periphery of a right end of the left output shaft 23 through a ball bearing 35 to be rotatable relative thereto. The right axle ARR is coupled to a right end of the right output shaft 24.

A left hydraulic clutch 29 and a right hydraulic clutch 30 are disposed in a space defined by the side housing 12 and a clutch cover 28 coupled to the side housing 12, in order that drive force transmitted from the propeller shaft PS to the first sleeve 20 through the flange 16, the input shaft 15, the drive bevel gear 17, and the follower bevel gear 18 can be transmitted selectively to the left output shaft 23 and the right output shaft 24.

Inside the side housing 12, a left oil pump 31 and a right oil pump 32 configured to operate the left hydraulic clutch 29 and the right hydraulic clutch 30, respectively, are disposed coaxially with each other. These are rotationally driven by a common electric motor 33 supported on an outer portion of the side housing 12. Moreover, inside the center housing 11, a lubrication oil pump 34 is disposed which is configured to be driven by the first sleeve 20 to supply lubrication oil to each portion to be lubricated of the rear differential gear Dr.

Figure 3:
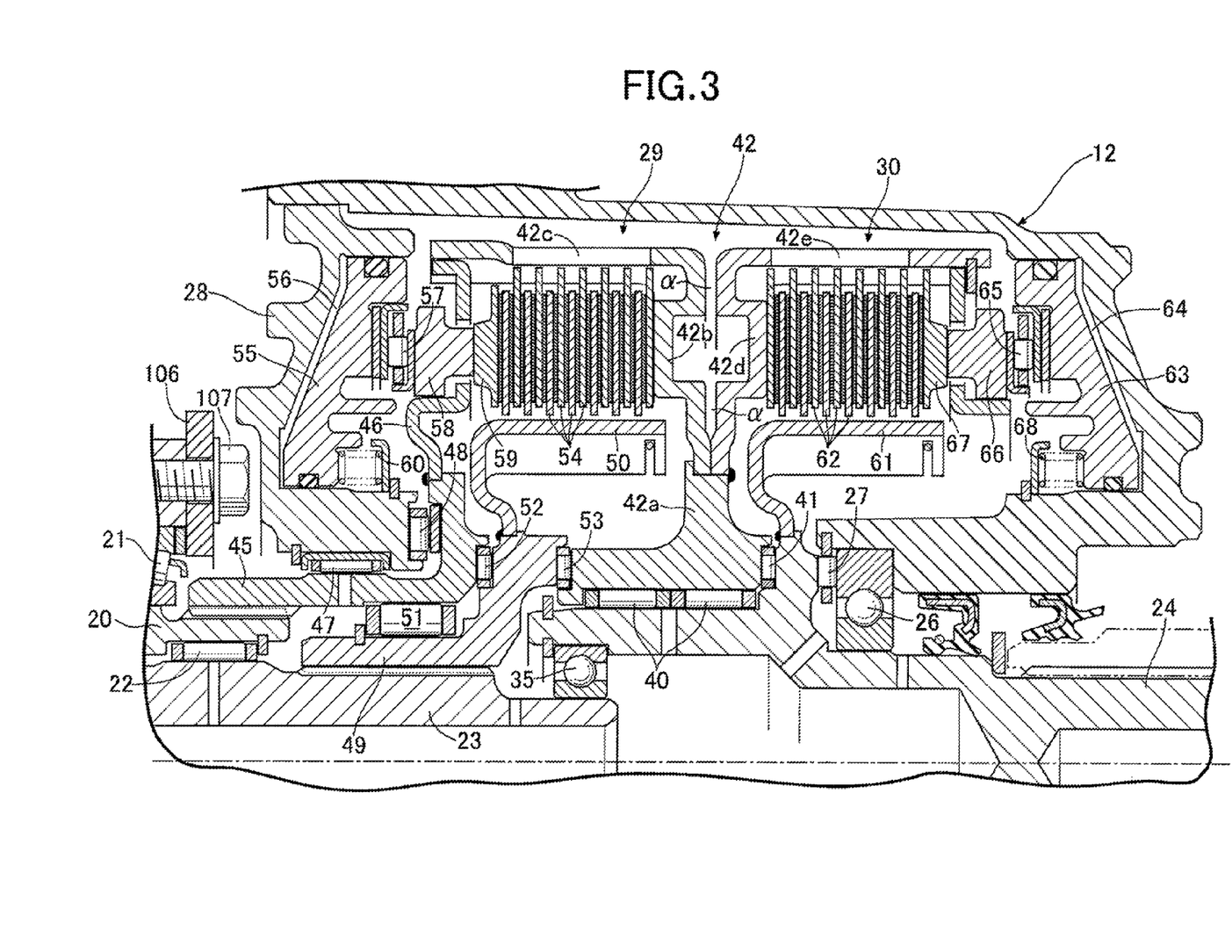
FIG. 3 is an enlarged view of a part indicated by an arrow 3 in FIG. 2. (first embodiment)

Next, the structure of each of the left hydraulic clutch 29 and the right hydraulic clutch 30 will be described in detail based on FIG. 3.

A boss portion 42a of a clutch outer 42 is supported on an outer periphery of the right output shaft 24 through needle bearings 40, 40 and a thrust bearing 41 to be rotatable relative thereto. An inner periphery of a left disk portion 42b of the left hydraulic clutch 29 and that of a right disk portion 42d of the right hydraulic clutch 30 are welded to an outer periphery of the boss portion 42a. The left and right disk portions 42b, 42d face each other with a gap α therebetween. A cylindrical left drum portion 42c of the left hydraulic clutch 29 is extended leftward, as viewed on the drawing, from the radially outer end of the left disk portion 42b. A cylindrical right drum portion 42e of the right hydraulic clutch 30 is extended rightward, as viewed on the drawing, from the radially outer end of the right disk portion 42d.

An inner periphery of a left end of a second sleeve 45 is spline-fitted to an outer periphery of the right end of the first sleeve 20. An inner periphery of a drive plate 46 is welded to a right end of the second sleeve 45. An outer periphery of the drive plate 46 is engaged with a left end of the left drum portion 42c of the clutch outer 42. A needle bearing 47 and a thrust bearing 48 are disposed between the second sleeve 45 and the clutch cover 28. The drive force of the first sleeve 20 is transmitted to the left drum portion 42c of the clutch outer 42 through the second sleeve 45 and the drive plate 46, and further transmitted therefrom to the right drum portion 42e through the left disk portion 42b, the boss portion 42a, and the right disk portion 42d.

An inner periphery of a left clutch inner 50 is welded to an outer periphery of a third sleeve 49 spline-fitted to an outer periphery of the right end of the left output shaft 23. A needle bearing 51 and a thrust bearing 52 are disposed between the third sleeve 49 and the second sleeve 45, and a thrust bearing 53 is disposed between the third sleeve 49 and the boss portion 42a of the clutch outer 42. Multiple left frictional engagement members 54 are disposed between the left drum portion 42c of the clutch outer 42 and the hydraulic clutch inner 50.

An annular left clutch piston 55 is slidably fitted in the clutch cover 28, and a left clutch oil chamber 56 is defined between the clutch cover 28 and the left clutch piston 55. A thrust bearing 57, a pressing member 58, and a pressure plate 59 are disposed between the left clutch piston 55 and the left frictional engagement member 54 at the left end as viewed on the drawing. As hydraulic oil is supplied to the left clutch oil chamber 56 to drive the left clutch piston 55 rightward as viewed on the drawing against the elastic force of a return spring 60, that pressure is transmitted to the left frictional engagement members 54 through the thrust bearing 57, the pressing member 58, and the pressure plate 59. The left frictional engagement members 54 are pressed against the left disk portion 42b of the clutch outer 42 to come into close contact with each other, whereby the left hydraulic clutch 29 is engaged.

Once the left hydraulic clutch 29 is engaged as described above, the rotation of the clutch outer 42 is transmitted to the left output shaft 23 through the left frictional engagement members 54, the left clutch inner 50, and the third sleeve 49, whereby part of the drive force of the engine E can be distributed to the left rear wheel WRL.

An inner periphery of a right clutch inner 61 is welded to the outer periphery of the left end of the right output shaft 24, and multiple right frictional engagement members 62 are disposed between the right drum portion 42e of the clutch outer 42 and the right clutch inner 61. An annular right clutch piston 63 is slidably fitted in the side housing 12, and a right clutch oil chamber 64 is defined between the side housing 12 and the right clutch piston 63. A thrust bearing 65, a pressing member 66, and a pressure plate 67 are disposed between the right clutch piston 63 and the right frictional engagement member 62 at the right end as viewed on the drawing. As hydraulic oil is supplied to the right clutch oil chamber 64 to drive the right clutch piston 63 leftward as viewed on the drawing against the elastic force of a return spring 68, that pressure is transmitted to the right frictional engagement members 62 through the thrust bearing 65, the pressing member 66, and the pressure plate 67. The right frictional engagement members 62 are pressed against the right disk portion 42d of the clutch outer 42 to come into close contact with each other, whereby the right hydraulic clutch 30 is engaged.

Once the right hydraulic clutch 30 is engaged as described above, the rotation of the clutch outer 42 is transmitted to the right output shaft 24 through the right frictional engagement members 62 and the right clutch inner 61, whereby part of the drive force of the engine E can be distributed to the right rear wheel WRR.

When the left hydraulic clutch 29, for example, is engaged, the pressure of the left clutch piston 55 presses the left disk portion 42b of the clutch outer 42 rightward through the left frictional engagement members 54 and slightly deforms the left disk portion 42b. However, a gap α is formed between the left disk portion 42b of the clutch outer 42 and the right disk portion 42d of the clutch outer 42. Moreover, the boss portion 42a to which the left and right disk portions 42b, 42d are connected is displaced radially inward from the line of action of the pressure. Hence, the deformation of the left disk portion 42b is not transmitted to the right disk portion 42d.

Accordingly, when the left hydraulic clutch 29 is engaged, the right disk portion 42d of the clutch outer 42 is not deformed, and the engagement of the right hydraulic clutch 30 can therefore be prevented. The same applies to when the right hydraulic clutch 30 is engaged: the left disk portion 42b is not deformed by the pressure of the right clutch piston 63 of the right hydraulic clutch 30, and the engagement of the left hydraulic clutch 29 can therefore be prevented. As described above, when the left and right hydraulic clutches 29, 30 are to transmit mutually different drive forces, the engaging actions of the left and right hydraulic clutches 29, 30 do not affect each other. This makes it possible to increase the accuracy of the control on the drive force distribution to the left and right rear wheels WRL and WRR that is performed by the rear differential gear Dr.

Figure 4:
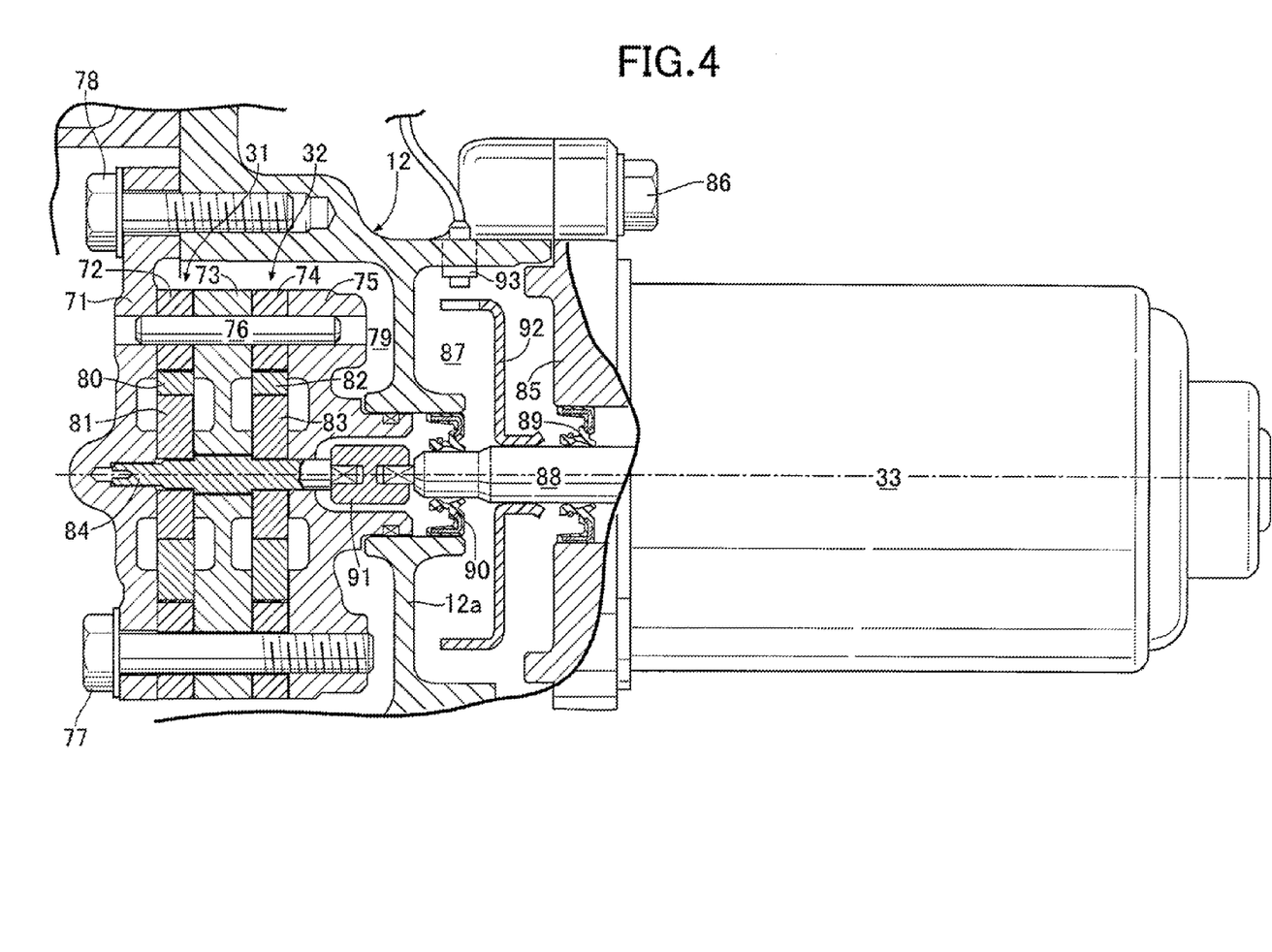
FIG. 4 is an enlarged view of a part indicated by an arrow 4 in FIG. 2. (first embodiment)

As shown in FIG. 4, the left and right oil pumps 31, 32 each formed by a trochoid pump are assembled as an integrated unit by-using bolts 77 in a state where a first pump case 71, a second pump case 72, a third pump case 73, fourth pump case 74, and a fifth pump case are stacked and positioned with a pin 76. With the fifth pump case 75 being fitted in a bulkhead portion 12a of the side housing 12 in a spigot-and-socket manner, the left and right oil pumps 31, 32 are fixed to the inner surface of the side housing 12 with a bolt 78 penetrating through the first pump case 71. A pump chamber 79 filled with oil is defined between the side housing 12 and the first pump case 71.

A left outer rotor 80 and a left inner rotor 81 having their opposite side surfaces sandwiched by the first and third pump cases 71, 73 are rotatably housed inside the second pump case 72 in a mutually meshing state. A right outer rotor 82 and a right inner rotor 83 having their opposite side surfaces sandwiched by the third and fifth pump cases 73, 75 are rotatably housed inside the fourth pump case 74 in a mutually meshing state. The left inner rotor 81 and the right inner rotor 83 are fixed to a pump shaft 84 rotatably supported on the first, third, and fifth pump cases 71, 73, and 75.

An attachment flange 85 of the electric motor 33 is fixed to the outer surface of the side housing 12 with bolts 86, and a rotor chamber 87 filled with air is defined between the bulkhead portion 12a of the side housing 12 and the attachment flange 85 of the electric motor 33. A rotary shaft 88 of the electric motor 33 penetrates the attachment flange 85 through a mechanical seal 89, further penetrates the bulkhead portion 12a through a mechanical seal 90, and is then connected to one end of the pump shaft 84 through a coupling 91.

Inside the rotor chamber 87, a rotor 92 with a number of protrusions formed on its outer periphery is fixed to the rotary shaft 88 of the electric motor 33. A rotational speed sensor 93 formed by a Hall element is attached to the side housing 12 in such a way as to face the outer peripheral surface of the rotor 92. The rotational speed sensor 93 is configured to detect a magnetic change caused by the rotation of the rotor 92 in the form of pulse signals, and to detect the rotational speed of the electric motor 33 on the basis of the time interval between the pulse signals.

Since the pump chamber 79 housing the left and right oil pumps 31, 32 is filled with oil, there is a problem that the oil or the moisture contained in the oil may enter the inside of the electric motor 33 and deteriorate the reliability and durability of a brush and the like. In this embodiment, however, the rotor chamber 87 filled with air is interposed between the pump chamber 79 and the electric motor 33, and moreover the portions of the rotor chamber 87 penetrated by the rotary shaft 88 of the electric motor 33 are sealed with the two mechanical seals 89, 90. Thus, the oil and the moisture thereof in the pump chamber 79 are blocked by the two mechanical seals 89, 90 and cannot enter the inside of the electric motor 33. This allows a more secure protection of the electric motor 33.

Moreover, if the rotor 92 were housed in the pump chamber 79, its rotation would stir the oil, which would in turn impose a load on the electric motor 33. This causes a problem of increasing the power consumption of the electric motor 33. In this embodiment, however, the rotor 92 is housed in the rotor chamber 87 in which only air is present. Accordingly, the resistance due to the stirring of the oil is eliminated, and the power consumption of the electric motor 33 can therefore be lowered.

Figure 5:
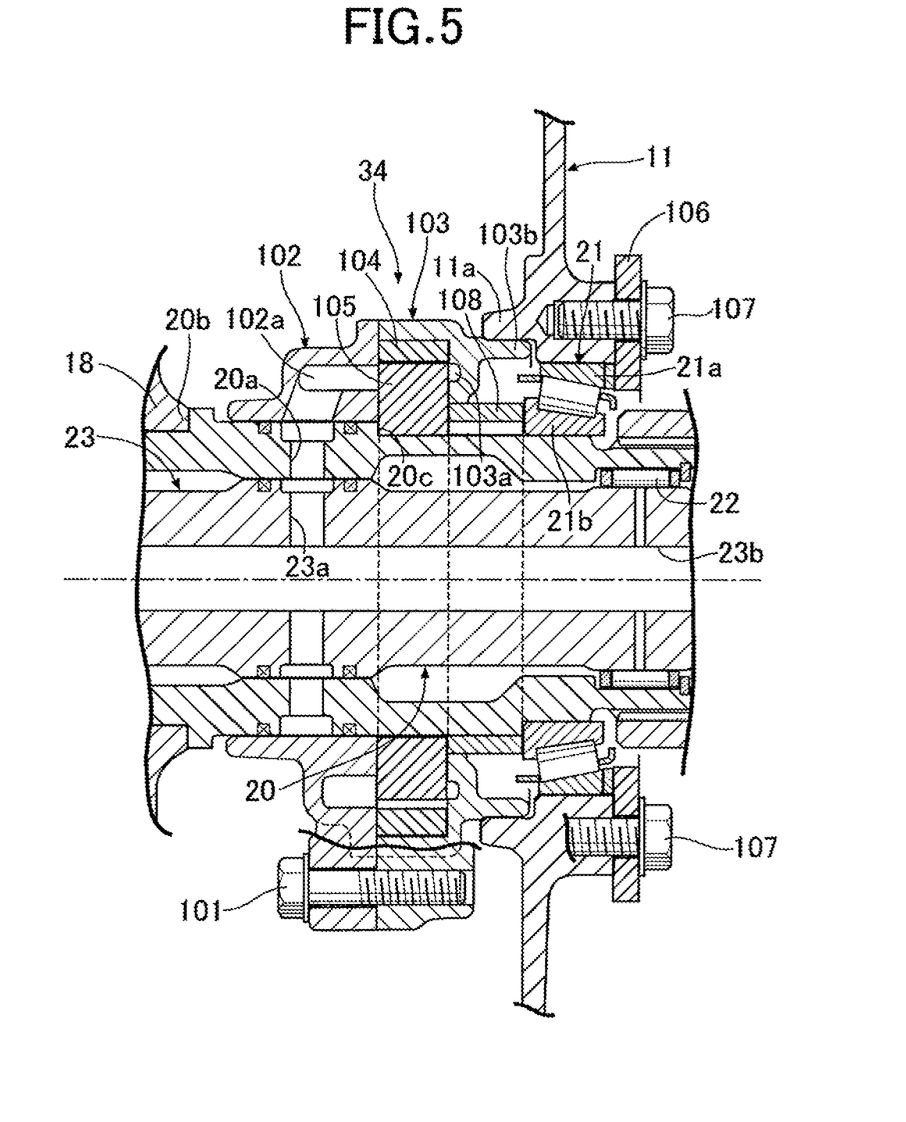
FIG. 5 is an enlarged view of a part indicated by an arrow 5 in FIG. 2. (first embodiment)
Figure 6:
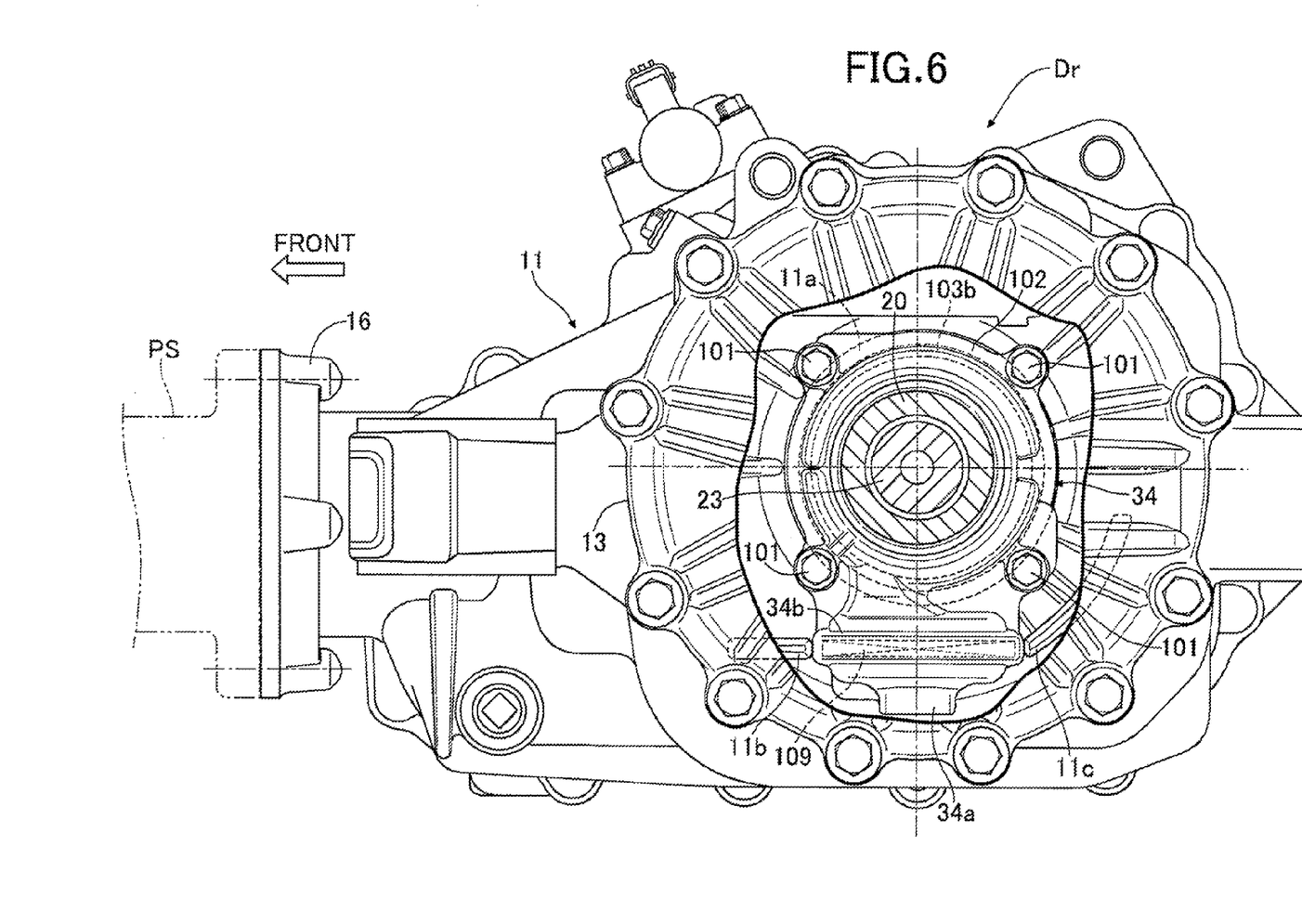
FIG. 6 is a view seen from arrow directions of a line 6-6 in FIG. 2. (first embodiment)

As shown in FIGS. 5 and 6, the lubrication oil pump 34 formed by a trochoid pump includes a left pump case 102 and a right pump case 103 integrally coupled to each other with four bolts 101. An outer rotor 104 and an inner rotor 105 that mesh with each other are housed inside the right pump case 103.

An inlet port 103a is formed in the right pump case 103, and an outlet port 102a is formed in the left pump case 102. Oil from the outlet. port 102a is supplied to an oil passage 23b in the left output shaft 23 through an oil hole 20a in the first sleeve 20 and an oil hole 23a in the left output shaft 23. The oil flowing out from the right end of the oil passage 23b in the left output shaft 23 lubricates the left and right frictional engagement members 54, 62 of the left and right hydraulic clutches 29, 30 surrounding the outer periphery of the left output shaft 23. The lengths of the oil supply paths can be minimized since the oil discharged by the lubrication oil pump 34 provided on the outer periphery of the first sleeve 20 lubricates the left and right frictional engagement members 54, 62 of the left and right hydraulic clutches 29, 30 disposed around the outer periphery of the first sleeve 20 as described above.

A fixing structure for the lubrication oil pump 34 will be described below.

The first sleeve 20 that supports and drives the lubrication oil pump 34 is retained by the center housing 11 and the side cover 13 in the following way to be immovable in the axial direction. As shown in FIGS. 2 and 5, the right end of the follower bevel gear 18 spline-fitted to the first sleeve 20 is in contact with a stepped portion 20b of the first sleeve 20, while the left end thereof is in contact with an inner race 19b of the tapered roller bearing 19 that has its outer race 19a supported on the side cover 13. This restricts leftward movement of the first sleeve 20.

Moreover, a fixing plate 106 is laid on the right surface of the center housing 11 and fixed thereto with bolts 107. With the fixing plate 106, the right surface of an outer race 21a of the tapered roller bearing 21 is retained immovably. The inner rotor 105 of the lubrication oil pump 34 is press-fitted leftward to a position at which the inner rotor 105 comes into contact with a stepped portion 20c on the outer peripheral surface of the first sleeve 20. Moreover, a collar 108 is disposed between the right surface of the inner rotor 105 and an inner race 21b of the tapered roller bearing 21.

Accordingly, when the lubrication oil pump 34 tries to Move axially leftward, that leftward load is supported by the side cover 13 through the inner rotor 105, the stepped portion 20c of the first sleeve 20, the first sleeve 20, the stepped portion 20b of the first sleeve 20, the follower bevel gear 18, and the tapered roller bearing 19, so that the lubrication oil pump 34 remains positioned. On the other hand, when the lubrication oil pump 34 tries to move axially rightward, that rightward load is supported by the center housing 11 through the inner rotor 105, the collar 108, the tapered roller bearing 21, and the fixing plate 106, so that the lubrication oil pump 34 remains positioned.

Moreover, an annular rib 103b projects rightward from the outer side surface of the right pump case 103 of the lubrication oil pump 34. An annular rib 11a projecting from the inner surface of the center housing 11 is fitted on the outer periphery of the rib 103b in a spigot-and-socket manner. Accordingly, the lubrication oil pump 34 is positioned on the center housing 11 immovably in the axial direction.

As is clear from FIG. 6, an oil suction port 34a is formed in a lower portion of the lubrication oil pump 34, and a strainer 109 is housed inside a strainer housing portion 34b formed above the oil suction port 34a. The oil suction portion 34a is located inside oil stored in a bottom portion of the center housing 11. Ribs 11b, 11c projecting from the inner surface of the center housing 11 are respectively in contact with the front and rear surfaces of the strainer housing portion 34b of the lubrication oil pump 34 that are eccentric from the center of the first sleeve 20. Accordingly, the lubrication oil pump 34 is positioned in such a way as be unrotatable about the first sleeve 20.

As described above, the lubrication oil pump 34 formed of the bolts 101, the left pump case 102, the right pump case 103, the outer rotor 104, and the inner rotor 105 is fixed to the inside of the center housing 11 in such a way as to be immovable in the axial, radial, and rotational directions, without using special bolts. Accordingly, the lubrication oil pump 34 can be attached and detached without splitting the center housing 11 into two parts in the front-rear direction or in the up-down direction. This makes it possible to reduce the number of components of the center housing 11 and the dimensions of the center housing 11.

Figure 7:
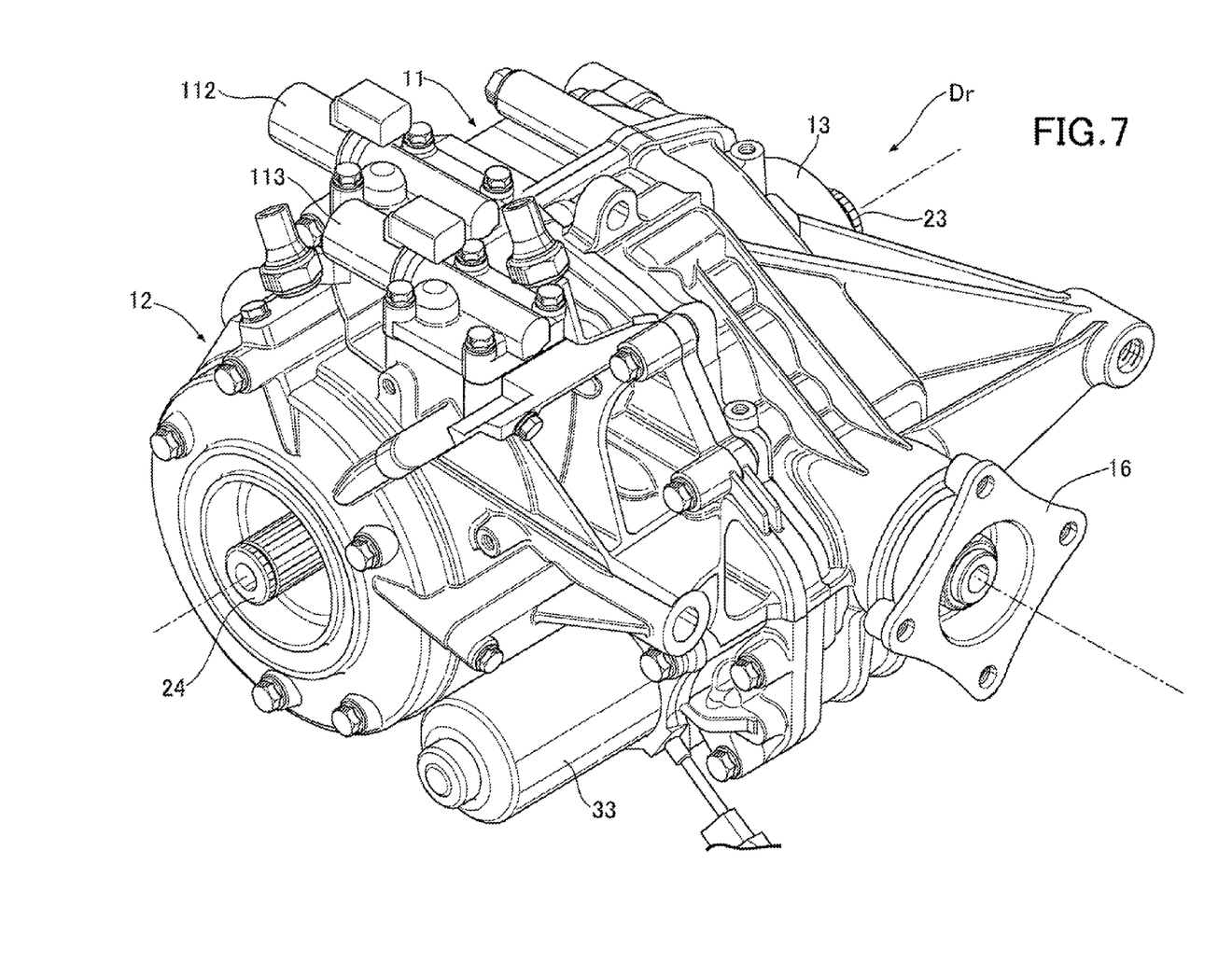
FIG. 7 is a view seen from a direction of an arrow 7 in FIG. 1. (first embodiment)
Figure 8:
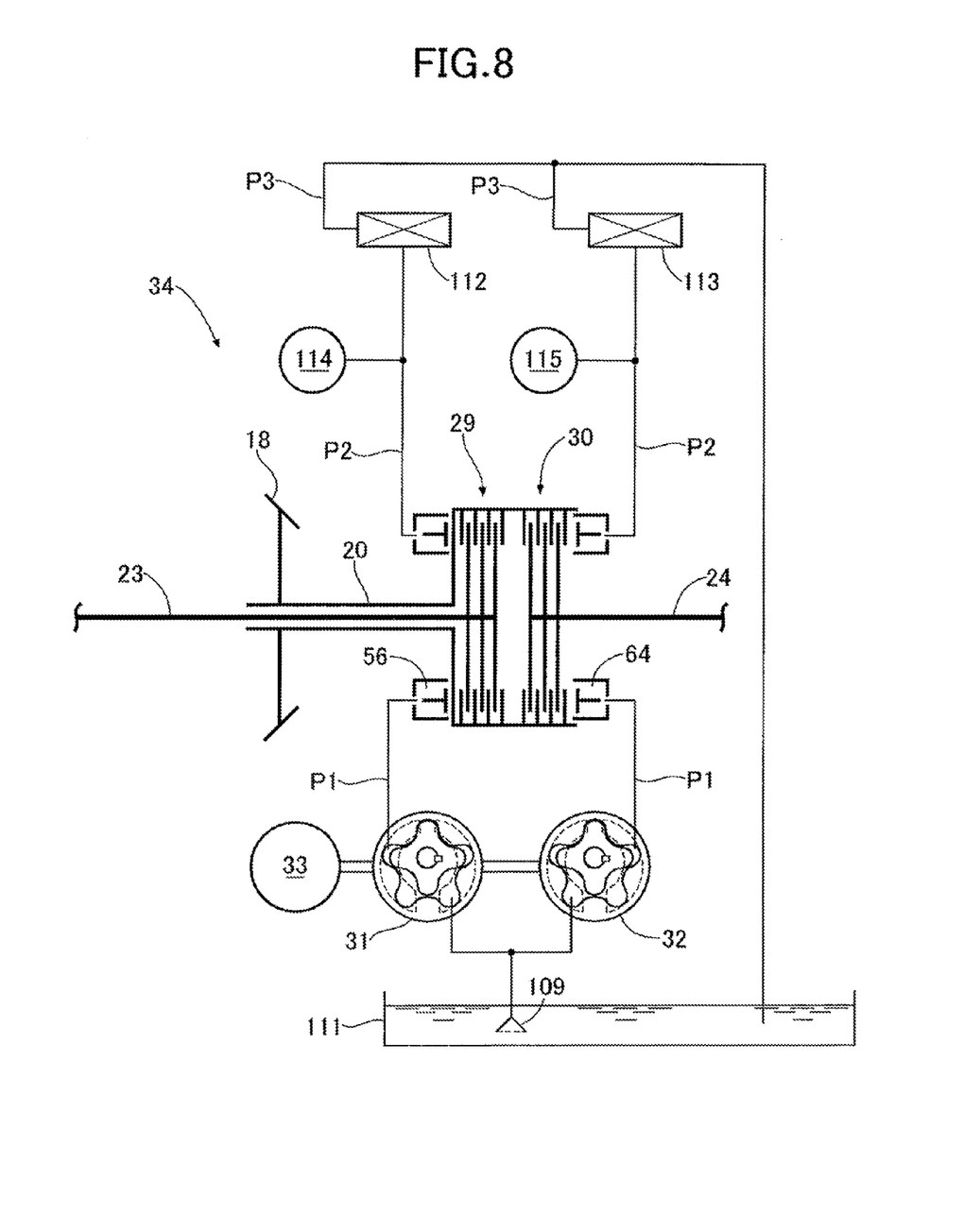
FIG. 8 is a view showing a hydraulic circuit of left and right hydraulic clutches. (first embodiment)

As shown in FIGS. 7 and 8, oil passages P1, P1 extending from the left and right oil pumps 31, 32 that suck oil from an oil reservoir 111 are connected to the left and right clutch oil chambers 56, 64 in the left and right hydraulic clutches 29, 30; oil passages P2, P2 extending from the left and right clutch oil chambers 56, 64 are connected to left and right linear solenoid valves 112, 113; and oil passages P3, P3 extending from the left and right linear solenoid valves 112, 113 are connected to the oil reservoir 111. Left and right hydraulic pressure sensors 114, 115 are connected to the oil passages P2, P2, respectively.

The oil reservoir 111 is disposed in a lower portion of the rear differential gear Dr. The left and right oil pumps 31, 32 (electric motor 33) are disposed in an intermediate portion, in the up-down direction, of the rear differential gear Dr. The left and right linear solenoid valves 112, 113 are disposed so as to be exposed at the upper surface of the rear differential gear Dr. In other words, the oil paths from the oil reservoir 111 to the left and right linear solenoid valves 112, 113 are formed, in such a way as to extend simply from a lower to upper side.

While the vehicle is running, the left and right oil pumps 31, 32 connected to the electric motor 33 discharge the oil constantly. When the left and right linear solenoid valves 112, 113 are in an open state, the oil discharged by the left and right oil pumps 31, 32 just passes through the left and right clutch oil chambers 56, 64, and therefore the left and right hydraulic clutches 29, 30 are not engaged. When the left and right linear solenoid valves 112, 113 are closed at predetermined opening degrees, the hydraulic pressures in the left and right clutch oil chambers 56, 64 located upstream rise, so that the left and right hydraulic clutches 29, 30 are engaged with predetermined engagement forces and transmit drive forces to the left and right rear wheels WRL and WRR. In this operation, the opening degrees of the left and right linear solenoid valves 112, 113 are subjected to feedback control so that the hydraulic pressures detected by the left and right hydraulic pressure sensors 114, 115 can be predetermined values that correspond to target engagement forces of the left and right hydraulic clutches 29, 30.

Meanwhile, if the left and right linear solenoid valves 112, 113 were disposed upstream of the left and right hydraulic clutches 29, 30, air sucked by the left and right oil pumps 31, 32 from the oil reservoir 111 would be accumulated in the left and right linear solenoid valves 112, 113 in a closed state. Thus, the air would flow abruptly into the left and right clutch oil chambers 56, 64 as soon as the left and right linear solenoid valves 112, 113 are opened. This may possibly deteriorate the response in the engagement of the left and right hydraulic clutches 29, 30.

In this embodiment, however, the left and right linear solenoid valves 112, 113 are disposed downstream of the left and right hydraulic clutches 29, 30. Thus, even when accumulated air is released abruptly as soon as the left and right linear solenoid valves 112, 113 are opened, the air is only returned to the oil reservoir 111. Accordingly, the response in the engagement of the left and right hydraulic clutches 29, 30 is not deteriorated. Moreover, the oil is constantly circulated while the left and right hydraulic clutches 29, 30 are not engaged. Furthermore, the oil paths from the oil reservoir ill to the left and right linear solenoid valves 112, 113 are formed in such a way as to extend simply from a lower to upper side. Accordingly, air is less likely to be accumulated in the paths, thereby preventing more securely the air entrapment of the left and right hydraulic clutches 29, 30.

Moreover, the left and right linear solenoid valves 112, 113 are disposed at the upper surface of the rear differential gear Dr. Accordingly, the left and right linear solenoid valves 112, 113 can be securely protected from flying rocks without providing a protection cover covering the lower surfaces thereof. Furthermore, neither the linear solenoid valves 112, 113 nor a protection cover need to be provided at the lower surface of the rear differential gear Dr. Accordingly, a ground clearance can be sufficiently secured for the rear differential gear Dr.

Although an embodiment of the present invention has been described above, various design changes can be made to the present invention without departing from the gist thereof.

For example, the power transmission device of the present invention is not limited to the rear differential gear Dr in the embodiment and may be a transmission.

Moreover, the application of the clutch device and oil pump of the present invention is not limited to the rear differential gear Dr, in the embodiment.

Moreover, the hydraulic pump of the present invention is not limited to the lubrication oil pump 34 in the embodiment and may be a hydraulic pump for generating a control oil pressure.

Moreover, each of the hydraulic clutches 29, 30 in the embodiment can be replaced with an electromagnetic clutch configured to drive a clutch piston with a solenoid.

The invention claimed is:

1. A power transmission device comprising left and right clutches including:
    left and right output shafts supported on a housing, the left and right output shafts being coaxial and rotatable relative to each other;
    an input shaft disposed on an outer periphery of one of the left and right output shafts in such a way as to be rotatable relative thereto;
    a clutch outer coupled to the input shaft;
    left and right clutch inners coupled to the left and right output shafts, respectively;
    a plurality of left frictional engagement members disposed between the clutch outer and the left clutch inner;
    a plurality of right frictional engagement members (62) disposed between the clutch outer and the right clutch inner;
    a left clutch piston configured to press the left frictional engagement members toward the right frictional engagement members; and
    a right clutch piston configured to press the right frictional engagement members toward the left frictional engagement members,
    wherein the clutch outer includes
        a boss portion positioned in an axial direction between the left and right clutch inners through a thrust bearing,
        left and right disk portions branching in two ways from the boss portion so as to support pressures of the left and right clutch pistons transmitted through the left and right frictional engagement members, respectively, and
        left and right drum portions extending in the axial direction from the left and right disk portions so as to guide outer peripheral portions of the left and right frictional engagement members, respectively, and
    a gap is formed between the left and right disk portions, radially outside of the boss portion.

2. The power transmission device according to claim 1, further comprising a lubrication oil pump in which a pump rotor supported on the input shaft is housed inside a pump case,
    wherein movement of the oil pump in the axial direction is restricted by use of a stepped portion provided to the input shaft and of a bearing supporting the input shaft on the housing, and
    wherein movement of the oil pump in a radial direction is restricted by fitting an annular rib, which projects from an inner surface of the housing, to an annular rib, which projects from an outer surface of the pump case.

3. The power transmission device according to claim 2, wherein positioning of the pump case about the input shaft is performed by bringing front and rear ribs projecting from the inner surface of the housing into contact with front and rear surfaces of the pump case which are eccentric from the input shaft.

4. The power transmission device according to any one of claims 1 to 3, wherein oil discharged by the oil pump is supplied as lubrication oil to the left and right clutches through an inside of the input shaft.

5. The power transmission device according to claim 4,
    wherein an electric oil pump configured to supply hydraulic pressures to the left and right clutches is housed in a pump chamber defined inside the housing and filled with oil,
    wherein a pump shaft of the electric oil pump is connected to and driven by a rotary shaft of an electric motor, and
    wherein an air chamber filled with air is defined between the electric motor, which is fixed to an outer portion of the housing, and the pump chamber.

6. The power transmission device according to claim 5, wherein a rotor for detecting a rotational speed of the electric motor is fixed to the rotary shaft penetrating the air chamber.

* * * * *